(12) United States Patent
Sherlock

(10) Patent No.: US 9,148,384 B2
(45) Date of Patent: Sep. 29, 2015

(54) POSTED AND UNENCUMBERED QUEUES

(75) Inventor: Derek Alan Sherlock, Boulder, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 833 days.

(21) Appl. No.: 13/370,730

(22) Filed: Feb. 10, 2012

(65) Prior Publication Data

US 2013/0208731 A1 Aug. 15, 2013

(51) Int. Cl.
*H04L 12/26* (2006.01)
*H04L 12/28* (2006.01)
*H04L 12/54* (2013.01)
*H04L 12/863* (2013.01)

(52) U.S. Cl.
CPC .................. *H04L 47/6215* (2013.01)

(58) Field of Classification Search
CPC ............ H04L 29/12009; H04L 41/5003; H04L 41/5067; H04L 45/26; H04L 45/48; H04L 47/10; H04L 47/6215; H04L 61/00; H04L 61/10; H04L 65/80; H04L 67/32; H04L 69/22; H04L 1/0002; H04L 1/0003; H04L 1/0025; H04L 12/5693; H04L 12/5695; H04L 29/06; H04L 41/00; H04L 41/0816; H04L 45/00; H04L 45/10; H04L 47/568; H04L 47/2433; H04L 65/103–65/104; H04L 65/1083; H04L 67/1097; H04M 7/006; H04W 28/14; H04W 40/00; H04W 48/18; H04W 52/46; H04W 88/06

USPC ................ 370/229–240, 389, 392–394, 370/395.2–401, 412–430
See application file for complete search history.

(56) References Cited

U.S. PATENT DOCUMENTS

| | | |
|---|---|---|
| 6,366,968 B1 * | 4/2002 | Hunsaker ........................ 710/52 |
| 6,484,218 B1 | 11/2002 | Pipho |
| 6,970,420 B1 * | 11/2005 | Kalkunte et al. .............. 370/230 |
| 7,035,212 B1 * | 4/2006 | Mittal et al. .................. 370/230 |
| 7,477,644 B2 | 1/2009 | Georgiou et al. |
| 7,487,284 B2 * | 2/2009 | Kapur et al. .................. 710/310 |
| 7,529,245 B1 | 5/2009 | Muller et al. |
| 7,562,194 B2 * | 7/2009 | Nayyar et al. ................ 711/151 |
| 7,808,999 B2 * | 10/2010 | Chen et al. .................... 370/394 |
| 7,861,024 B2 * | 12/2010 | White et al. .................. 710/263 |
| 8,769,175 B2 * | 7/2014 | Liu ............................... 710/116 |
| 8,880,760 B2 * | 11/2014 | Sherlock et al. ................ 710/39 |
| 2003/0018863 A1 * | 1/2003 | Hill et al. ...................... 711/158 |
| 2007/0156980 A1 | 7/2007 | Nayyar et al. |
| 2008/0025289 A1 * | 1/2008 | Kapur et al. .................. 370/351 |

* cited by examiner

*Primary Examiner* — Tri H Phan
(74) *Attorney, Agent, or Firm* — Hewlett-Packard Patent Department

(57) ABSTRACT

In one aspect, techniques are provided for adding a packet to a queue. A packet may be received. A determination may be made if the packet is encumbered or unencumbered. The packet may be added to a posted queue, to an encumbered queue, or a unencumbered queue based on the determination. In another aspect, techniques are provided for de-queuing a packet in a posted queue. A posted packet may be de-queued and encumbered queues associated with the packet may be added to unencumbered queues.

18 Claims, 8 Drawing Sheets

POSTED AND UNENCUMBERED QUEUES

BACKGROUND

In packet-oriented communications, packets traversing a communications fabric may represent messages belong to multiple message classes (sometimes known as ordering classes, flow control classes, or virtual channels). One example of a physical communication channel bearing multiple message classes includes PCI Express, although there are many other such channels. Message classes exist if different streams of messages share a common fabric, yet have different flow control, ordering, or passing restrictions or requirements.

A single message class may have ordering constraints within itself. For example, the preservation of strict ordering or the prohibition of passing based upon some packet-specific criterion such as a conflict of their associated protocol-layer addresses. In addition to ordering constraints within a message class, there may be ordering restrictions and passing restrictions or independence requirements between message classes.

Passing restrictions or independence requirements within or between message classes may arise for various reasons. They may be required to avoid deadlock, to correctly support a data coherency or consistency model, or to allow for performance optimizations. In some cases, passing of packets in one class by those in another may be required for correct operation yet undesirable for performance.

DETAILED DESCRIPTION

Figure 1:
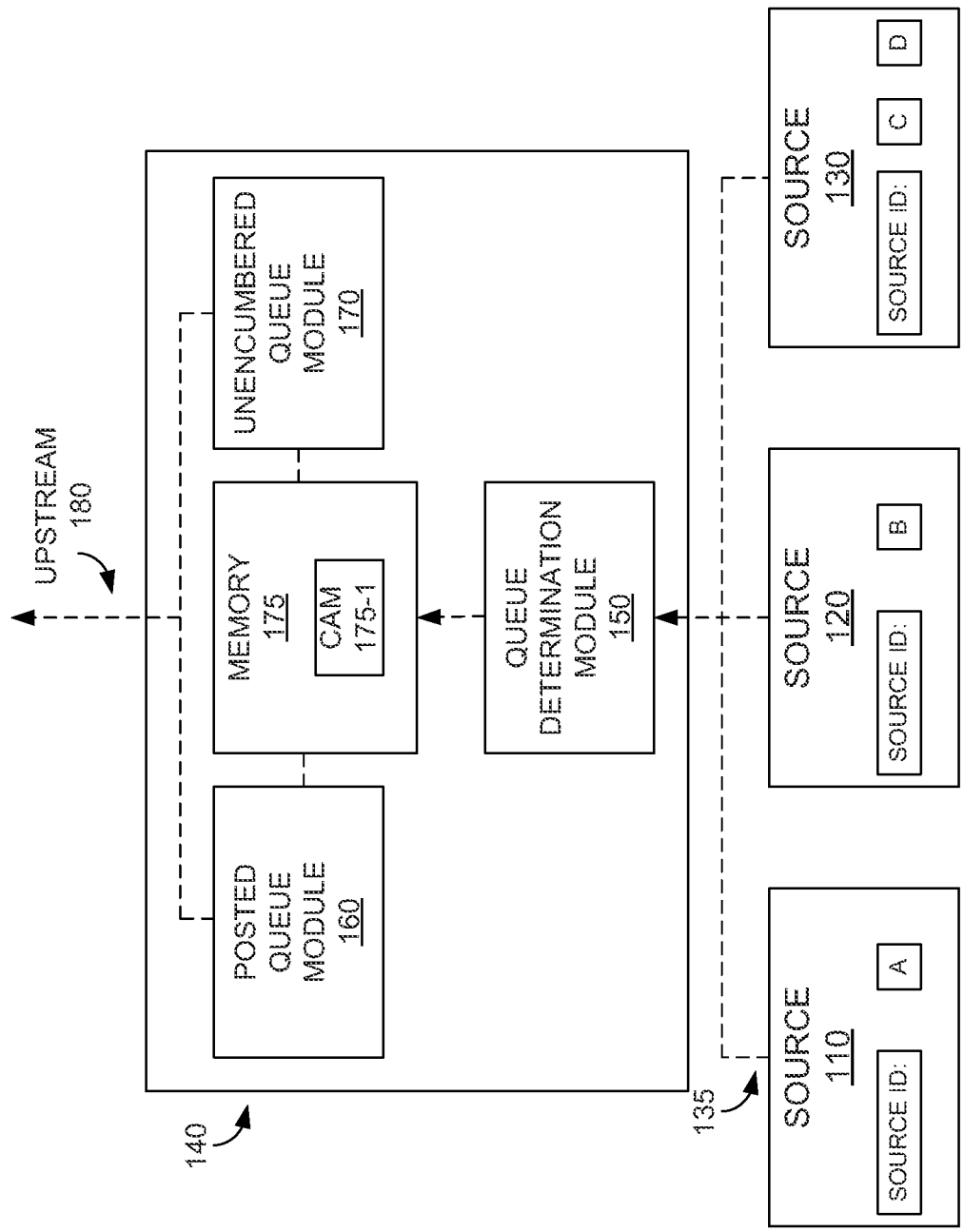
FIG. 1 depicts an example of a block diagram of a system.

To illustrate the concepts presented with respect to packet passing, consider the PCI Express (PCIe) fabric. Although the following description is based on PCI Express, it should be understood that the techniques presented herein are not limited to PCI Express and are applicable to any fabric containing multiple message classes. Message classes in PCI express are referred to as ordering classes. A Direct Memory Access (DMA) read request is one type of PCIe packet that is included in an ordering class referred to as a non-posted class. A DMA write request is another type of PCIe packet that is included in an ordering class referred to as a posted class. Yet a third type of PCIe packet is a completion packet that is included in an ordering class of packets referred to as a completion class.

In general, a PCIe card may send packets toward a root port. According to the PCIe specification, posted class packets, which may be referred to as posted packets, are allowed to pass non-posted class packets, which may be referred to as non-posted packets, as they travel toward the root port. The reason for this is that if a non-posted packet were to form an impassible barrier to the passage of a posted packet, a deadlock could result. PCIe uses per ordering class credit based flow control and if sufficient credits are not available to send a non-posted class packet, absent passing, all posted packets would be blocked, even if sufficient credits were available for the posted class.

However, such passing may be counterproductive to system performance. Posted packets are typically large packets, fanning in from many IO cards to a single Root Port, thereby creating congestion. Because they are posted requests, long queuing delays seen by posted packets are not directly harmful to posted packet performance. But, if that queuing delay is also experienced by non-posted packets, which are trapped behind the posted packets, performance problems may result. Non-posted packets are latency sensitive and any unnecessary queuing delays are costly to performance.

Thus, both directions of posted and non-posted passing have a role to play. Posted packet passing non-posted packet is used to prevent deadlock, while non-posted packet passing posted packet is desired, and permitted under certain conditions, to improve non-posted packet performance. The conditions imposed on non-posted packets passing posted packets are embodied in an aspect of the PCIe specification called Identification Based Ordering (IDO). Completion packets are another class of packet that may benefit from the ability to pass other classes of packets. Just as above, the PCIe specification provides rules for the passing of and passing by completion packets. In addition, the PCIe specification provides an additional set of rules called Relaxed Ordering (RO) for completion packets. The rules of IDO and RO are described in further detail below.

As described above, in the PCI Express architecture there are generally three ordering classes: Posted, Non-Posted, and Completion. The rules for when and how a packet of one class may pass others of the same or different class have been set out in the PCI Express specification. In general, a posted packet will not pass another posted packet. The rules for a posted packet using IDO do allow for a posted packet to pass another posted packet that comes from a different source, however such passing does not provide any benefit in performance. As such, for purposes of this description, a posted packet passing another posted packet is not allowed. A posted packet may pass any non-posted or completion packet. The rules for a non-posted packet using IDO are that a non-posted packet may pass any posted packet that does not have the same source identifier as the non-posted packet. A non-posted packet that is not using IDO may not pass any posted packet, regardless of source. A non-posted packet may pass other non-posted packets, subject to the rules above. A non-posted packet may pass any completion packet, regardless of source.

The rules for completion packets are slightly more complex. If IDO is not allowed for a completion packet, the packet is not allowed to pass any posted packet. If IDO is allowed, but RO is not allowed, then a completion packet is not allowed to pass any posted packet that contains the same source identifier as the completion packet. If RO is allowed, then a completion packet is allowed to pass any posted packet, regardless of source. Based on the IDO and RO rules, a completion packet may not pass any other completion packet, regardless of source. A completion packet may pass any non-posted packet, regardless of source.

The rules described above explain when one packet may pass another packet when using IDO and RO. It should be understood that although a packet may pass another packet, the packet is not required to do so. Furthermore, there is generally no requirement for ordering of packets of different classes or within a class, other than those which result from the rules specified above, when using IDO and RO. The techniques described herein are compliant with the IDO and RO passing rules.

Although the rules presented above are fairly straight forward, implementation of the necessary control logic to follow the rules can be fairly complex due to the fact that there are multiple classes of packets, with multiple source identifiers, with ordering requirements spanning the packet class, source identifier, and arrival time.

The techniques described herein overcome the problem of implementing the control logic to allow for packet passing by providing an efficient queue based solution that has a low degree of complexity, resulting in easier implementation. In operation, several different queues are maintained. For example, there may be a posted queue, an encumbered non-posted queue and encumbered completion queue associated with each packet in the posted queue, and an unencumbered non-posted queue and unencumbered completion queue. As packets are received, logic is provided to make a decision as to which queue the packet will be added.

Furthermore, as packets are de-queued from the various queues when sufficient credits are available, logic is provided to move packets between the queues. The logic ensures that no packet is eligible to be de-queued, even if sufficient credits are available, if de-queuing such a packet would result in a violation of the ordering rules described above. Further description of the techniques for achieving these results is provided below and in conjunction with the attached drawings.

FIG. 1 depicts a block diagram of a device. The device 140 depicted in FIG. 1 may be a type of device that may utilize the techniques described herein. The device 140 may contain a queue determination module 150, a posted queue module 160, a unencumbered queue module 170, and a memory 175 coupled to each of these modules. The device 140 may typically be implemented in hardware. Due to the processing speed requirements needed in today's computing environment, the device may generally be implemented as an application specific integrated circuit (ASIC) or may be included as part of a larger device, such as a processor. The device may contain memory, general purpose processors, and dedicated control logic. The various modules that are described may be implemented using any combination of the memory, processors, and logic as needed.

Queue determination module 150 may receive packets over a fabric, 135, such as a PCI fabric, from any number of sources. For example, shown in FIG. 1 are three sources 110, 120, and 130. A source may be any device that accesses the fabric. For example, a device may be a peripheral card in a computer such as a RAID controller. Each source may include one or more source identifiers. A source identifier may be used to identify the source of a particular packet that is placed on the fabric. For example, as shown source 110 includes a source identifier labeled A. All packets placed on the fabric by source 110 will include the identifier A. Likewise, source identifier 120 includes a source identifier labeled B.

A single source may also place packets on the fabric with more than one source identifier. For example, in the PCI-Express specification, each function provided by a device may contain its own source identifier. So, a device attached to the fabric that provides more than one function may include more than one source identifier. Furthermore, some devices may act as aggregators of packets from other devices and forward those packets on. In the PCI-Express architecture, there may be a single destination referred to as the root complex which is the destination for all packets sent from sources. Packets headed toward the root complex may be said to be going in the upstream direction 180. A device, such as a bridge, may serve to aggregate packets from other devices and forward them toward the root complex. Thus, a device such as a bridge may receive packets, each containing a source identifier, from multiple sources, and forward those packets on toward the root complex. Although the techniques described herein are applicable to packets headed in the upstream (toward the root complex) direction and the downstream (headed away from the root complex) direction, the benefits are more readily apparent in the upstream direction. Thus, the remainder of this disclosure will be described in terms of packets headed in the upstream direction. However, it should be understood that the same techniques may also be used for packets headed in the downstream direction.

Source 130 is an example of a source that includes multiple source identifiers. Source 130 may be a device that provides multiple functions or it may be a device, such as a bridge, that aggregates packets from other devices. Device 140 itself may be a device such as a root complex, in which case it is the destination for all upstream packets on the fabric. Device 140 may also be an aggregation device, collecting packets from other devices and forwarding them on toward the root complex. The techniques described herein are applicable regardless of if the device 140 is the final destination of the packets.

Queue determination module 150 may receive packets from the various sources and determine in which queue the packet should be placed. For example, a packet of class posted that is received may be placed in a posted queue. Posted queue module 160 may maintain a queue for all posted packets in memory 175. For example, posted queue module 160 may maintain a plurality of queues implemented as linked lists. The data packets received by the queue determination module may be placed in memory 175 and the posted queue module may create links, such as pointers, to the locations in memory, to form the queues and to maintain queue ordering. In one example implementation, the source identifier of each packet may be placed in a Content Addressable Memory (CAM) 175-1. A CAM is a memory structure that may be indexed based on the contents. For example, given a source identifier, a CAM may be useful to quickly identify all packets in memory that contain that source identifier. Use of the CAM will be described in further detail below.

Posted queue module 160 may also maintain encumbered queues for each posted class packet. Just as with the queue for posted packets, in an example implementation, encumbered queues may also be implemented as linked lists. Again, memory space for the packets may be allocated from memory 175, and the maintenance of the linked list performed by the posted queue module.

Unencumbered queue module 170 may maintain a queue of unencumbered packets. Just as above, the queue of unencumbered packets may be maintained as a linked list, with the actual contents of the packets stored in memory 175. Further description of the posted, unencumbered, and encumbered queues is presented below.

In operation, a packet may be received from one of the sources 110, 120, 130. The queue determination module may store the contents of the packet in the memory 170. Based on the class of packet and the source identifier, the queue determination module may determine to which queue the packet should be added. Once the determination has been made, the modules responsible for the various queues may add the packet to the correct queue. In an example implementation using linked lists, the packet may be added by setting a link in the linked list to point to the location in memory in which the packet is stored.

In addition to en-queuing packets, the posted queue module and unencumbered queue module may also de-queue packets for transmission upstream 180. De-queuing a packet may be based on sufficient flow control credits for that packet class being available. These modules ensure that no packet is de-queued if such a de-queuing would result in a violation of the passing rules that were described above.

Figure 2:
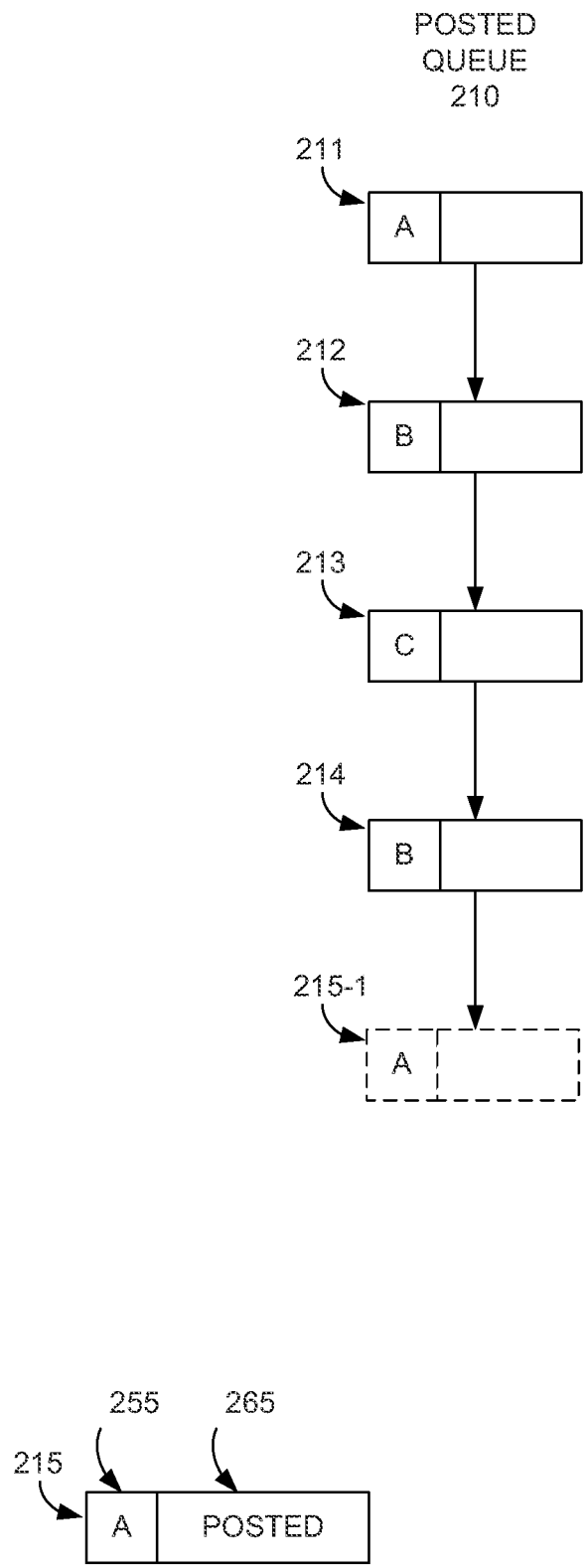
FIG. 2 depicts an example of adding a posted packet to queue.

FIG. 2 depicts adding a posted packet to queue. The posted queue module 160 may maintain a posted queue 210. The posted queue may behave as a First In First Out (FIFO) queue. In one example implementation, the posted queue may be implemented as a linked list. When a packet is added to the posted queue, the packet may be added at the end, which may also be referred to as the tail, of the linked list. A packet to be removed from the posted queue maybe removed from the beginning of the linked list. The beginning of the linked list may also be referred to as the head of the linked list. By adding packets to the tail of the list and removing packets from the head of the list, the posted queue forms a FIFO.

As shown, the posted queue 210 currently contains four posted packets 211, 212, 213, 214. Each of these packets 211, 212, 213, 214 includes a source identifier, which is indicated by the letters A, B, C. In an example implementation the portions of each packet containing the source identifier, may be stored in a Content Addressable Memory (CAM) that is associative by the source identifier. Storing the source identifier in a CAM allows for rapid identification of packets containing a specified source identifier. In a different example implementation the linked list may be traversed from beginning to end to identify all packets within the posted queue that contain a specified source identifier. Use of a CAM or traversing the linked list to located packets with a specified source identifier will be described in further detail with respect to FIGS. 3 and 4.

In some example implementations, the posted queue may be a linked list of pointers, with each pointer pointing to a location in memory where the actual packet is stored. Regardless of specific implementation, what should be understood is that the posted queue is a FIFO queue in which packets are added at one end and removed from the other end. In addition, a mechanism for finding packets containing a specified source identifier is also provided.

At some point in time, a new packet maybe received by the queue determination module 150. For example, packet 215 may be received. Packet 215 may include a source identifier 255, which as shown in this case is source A. Packet 215 may also include an indication of the class of packet 265. As shown, the class of packet 215 is posted. For the remainder of this description arriving packets will be described with a single identifier, however it should be understood that each arriving packet includes a packet class and a source identifier.

When a new posted packet is received by the queue determination module 150, the module may send the packet to the posted queue module 160. The posted queue module may then add the packet to the end of the posted queue 210 FIFO. As shown, packet 215-1, which represents packet 215 once it has been added to the posted queue, may be added to the end of the posted queue. For the remainder of this disclosure, an arriving packet will be referenced by a number (e.g. 215) and the packet will be referenced by that number -1 (e.g. 215-1) once placed in any queue. As explained above, posted packets are strictly ordered and are not allowed to pass each other. As such, the posted queue reflects the order in which posted packets are received, which in turn dictates the order in which the posted packets are sent upstream. Because the posted queue is a FIFO, no passing of posted packets by other posted packets is possible.

In addition, each packet in the posted queue may be associated with an encumbered non-posted queue and an encumbered completion queue (not shown). Each of the encumbered queues is also a FIFO queue. In some example implementations, each encumbered queue may be implemented as a linked list. Each encumbered queue associated with a packet in the posted queue may contain zero or more packets. Use of the encumbered non-posted and completion queues will be described in further detail with respect to FIGS. 3 and 4.

Figure 3:
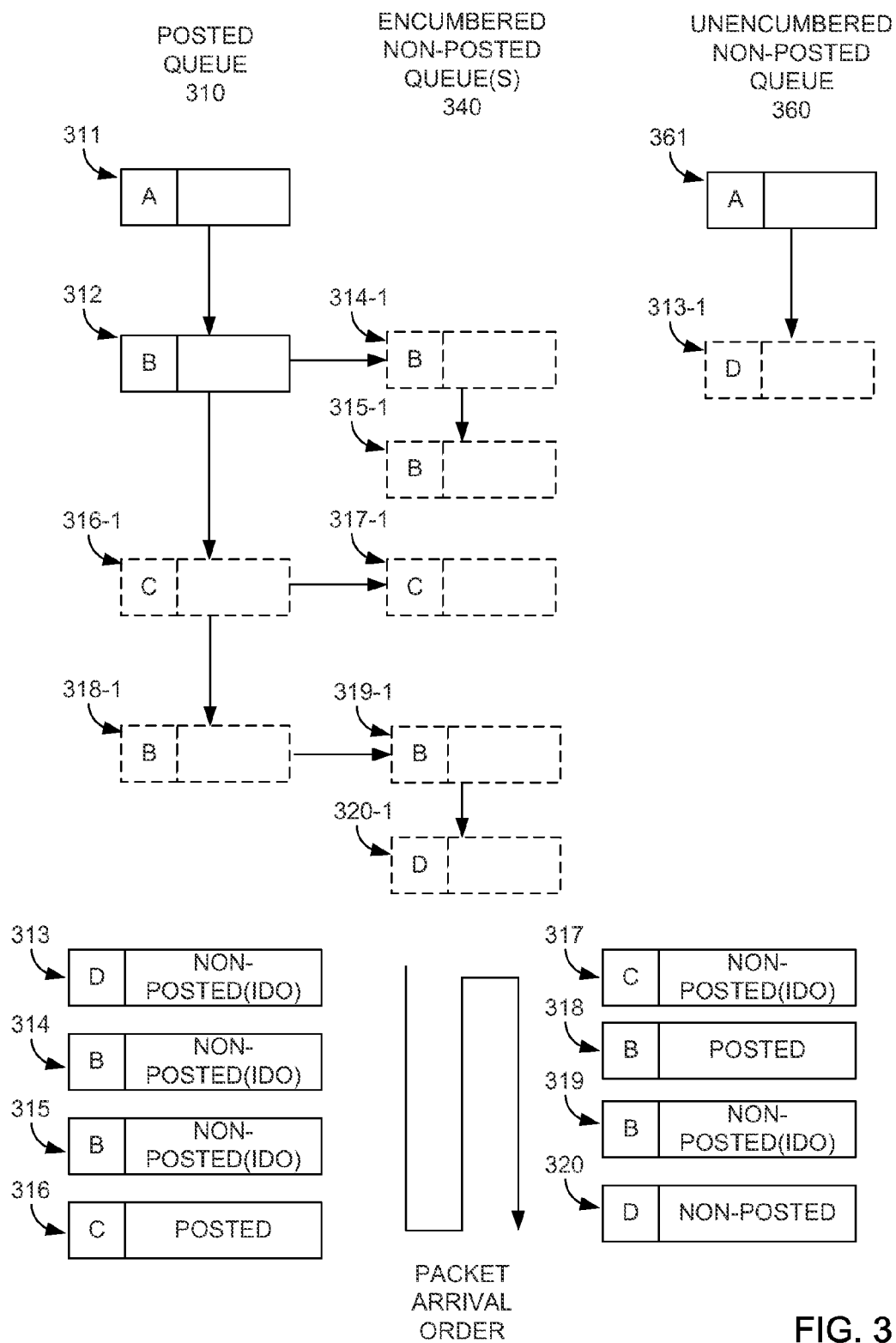
FIG. 3 depicts an example of adding a non-posted packet to a queue.

FIG. 3 depicts adding a non-posted packet to a queue. For purposes of the description of FIG. 3, assume that in the beginning, posted queue 310 contains two posted packets 311, 312. These posted packets may have been added to the posted queue according to the process described in FIG. 2. FIG. 3 also includes an unencumbered non-posted queue 360 containing packet 361. For purposes of this description, assume that at the beginning, packet 361 is already included in the unencumbered non-posted queue and was received prior to the receipt of packet 311. Operation of the unencumbered non-posted queue will be described in further detail below.

Al some point in time, packet 313 may arrive. As shown, packet 313 is a non-posted packet that was received from source D with IDO enabled. As described above, the passing rules indicate that a non-posted IDO packet may pass any posted packet from a different source as it makes its way upstream. The queue determination module 150 may receive packet 313 and determine if any posted packets with the same source identifier are contained in the posted queue. For example, the CAM of the posted queue module may be accessed to determine if any packets in the posted queue contain source identifier D. In this case, no packets in the posted queue are from source D. Thus, according to the passing rules, packet 313 may be sent upstream at any time that sufficient credits are available, without concern that a posted packet from the same source will be passed.

The queue determination module 150 may then place packet 313 in the unencumbered non-posted queue 360. As shown, packet 313-1 is placed in the unencumbered non-posted queue. The unencumbered non-posted queue is also a FIFO queue. In one example implementation, the unencumbered non-posted queue may be implemented as a linked list. Just as with the posted queue, packets are added to the end of the FIFO and are removed from the beginning of the FIFO. The unencumbered non-posted queue, as the name implies, holds packets that are not encumbered by any other packet. In other words, it is always legal to de-queue the packet at the head of the unencumbered non-posted queue if sufficient credits are available, without concern that any passing rule will be violated. As explained above, packet 313 is a non-posted IDO packet from source D. Because there are no posted packets from source D, it is permissible to send packet 313 upstream as soon as it reaches the head of the unencumbered non-posted queue and sufficient credits are available.

At this point it is worth mentioning the reason why the assumption that packet 361 was received after posted packet 311 was made. As shown, both of the packets are from source A. If this assumption was not made, it would be possible that packet 361 would be de-queued prior to posted packet 311, as it is always legal to de-queue a packet from the unencumbered non-posted queue if sufficient credits are available. If packet 361 had arrived after packet 311, this would have resulted in a violation of the rule that non-posted packets may not pass posted packets from the same source. Receipt of a non-posted packet from a source when a posted packet from the same source is in the posted queue will now be described with respect to packet 314.

At some later point in time, packet 314 may be received. As shown, packet 314 is a non-posted IDO packet and comes from source B. As mentioned earlier, a posted packet 312 from the same source is already in the posted queue. The queue determination module may examine the posted queue to determine if any packets with the same source identifier exist in the queue. For example, the CAM of the posted queue may be accessed, and this access will hit on packet 312. In this case, there is only one CAM hit, as at this point in the description there is only one posted packet from source B. The case with multiple CAM hits is described below. The queue determination module may then determine that packet 314 is encumbered by packet 312 because packet 314 may not pass packet 312 on the way upstream without violating the passing rules. For purposes of the remainder of this description, determining if packets have the same source identifier may include accessing the CAM of the posted queue and examining any CAM hits that result.

The queue determination module may then determine that packet 314 should be placed in the encumbered non-posted queue 340 that is associated with packet 312. As mentioned above, each packet in the posted queue is associated with an encumbered non-posted queue and an encumbered completion queue. Packets in an encumbered non-posted queue may not pass the posted packet associated with the encumbered non-posted queue on the way upstream. Each encumbered non-posted and completion queue is similar to a FIFO in that packets are added to the end of the queue. However, packets are not directly removed from the beginning of the queue. The process of de-queing packets in the encumbered non-posted and completion queues is described below. In an example implementation, unencumbered non-posted queues may be implemented as a linked list. Just as above, packets are added to the tail of the list and are removed from the head. However, it should be understood that such ordering is for purposes of ease of implementation, as there are no ordering rules between non-posted packets, except for those described above. The queue determination module may then place packet 314 in the encumbered non-posted queue associated with posted packet 312. The process of de-queuing packets that are contained in encumbered non-posted queues will be described with respect to FIG. 5.

At some point in time, packet 315 may be received. As shown, packet 315 is a non-posted IDO packet from source B. The queue determination module may determine if any posted packets from the same source are included in the posted queue. Just as above, the queue determination module determines that packet 312 is from the same source. Thus, packet 315 is to be added to the encumbered non-posted queue associated with packet 312. Packet 315-1 is then added to the encumbered non-posted queue associated with packet 312. Because the encumbered non-posted queues are implemented as FIFO queues, packet 315 is added to the encumbered non-posted queue at the end, which is after packet 314-1. As mentioned above, such ordering is for ease of implementation and is not required.

At some point in time packet 316 may be received. As shown, packet 316 is a posted packet from source C. Following the process described with respect to FIG. 2, packet 316-1 is added to the posted queue. Packet 317 may then be received. As shown, packet 317 is a non-posted IDO packet from source C. The queue determination module may determine that packet 317 is encumbered by posted packet 316-1, because they both have the same source identifier. As such, packet 317-1 is added to the encumbered non-posted queue associated with packet 316-1.

Packet 318, which is a posted packet from source B, may be received by the queue determination module. Following the process described above, packet 318-1 is added to the posted queue. Packet 319 may then be received. Packet 319 is a non-posted IDO packet from source B. The queue determination module may then access the posted queue as has been described above. However, in this case there are now two posted packets 312, 318-1 that contain the same source identifier as packet 319. In implementations using a CAM, the result is that a CAM hit will be achieved on both packets 312 and 318-1.

The posted queue module may then make a determination as to which of packets 312 and 318-1 is the most newly added packet. The most newly added packet is the packet that was the latest one in time to be received. In other words, the most newly added packet is the packet that is closest to the tail of a queue. In one example implementation, determination of the most newly added packet uses a priority encoder. The inputs to the priority encoder may be each entry that resulted in a CAM hit. The inputs may be ordered such that entries closer to the tail of the posted queue are higher in priority. Thus, the entry closest to the tail of the posted queue may be identified by the priority encoder. In this case, packet 318-1 is the most newly added packet. As such, the packet 319-1 is added to the encumbered non-posted queue that is associated with packet 318-1. The reason that the most newly added packet is chosen is so that the passing rules are not violated. As explained above, non-posted packets are not allowed to pass posted packets with the same source identifier that were received prior in time to the non-posted packet. Thus, it would not be permissible for packet 319-1 to pass packet 318-1, because packet 318-1 was received earlier in time. Had packet 319-1 been added to the encumbered non-posted queue associated with packet 312, it would have been possible for packet 319-1 to be sent upstream prior to packet 318-1, which would be a violation of the passing rules.

At some point in time, packet 320 may be received. As shown, packet 320 is a non-posted non-IDO packet from source D. As mentioned above, a non-posted non-IDO packet is not allowed to pass any posted packet, regardless of source. The queue determination module may determine the most newly added posted packet, for example by using the priority encoder scheme described above. In this case, the most newly added posted packet is packet 318-1. Packet 320-1 may then be added to the encumbered non-posted queue associated with packet 318-1. It should be noted that if the posted queue were empty, packet 320-1 could simply have been added to the unencumbered non-posted queue because there would have been no encumbered non-posted queue because the queue was empty.

Figure 4:
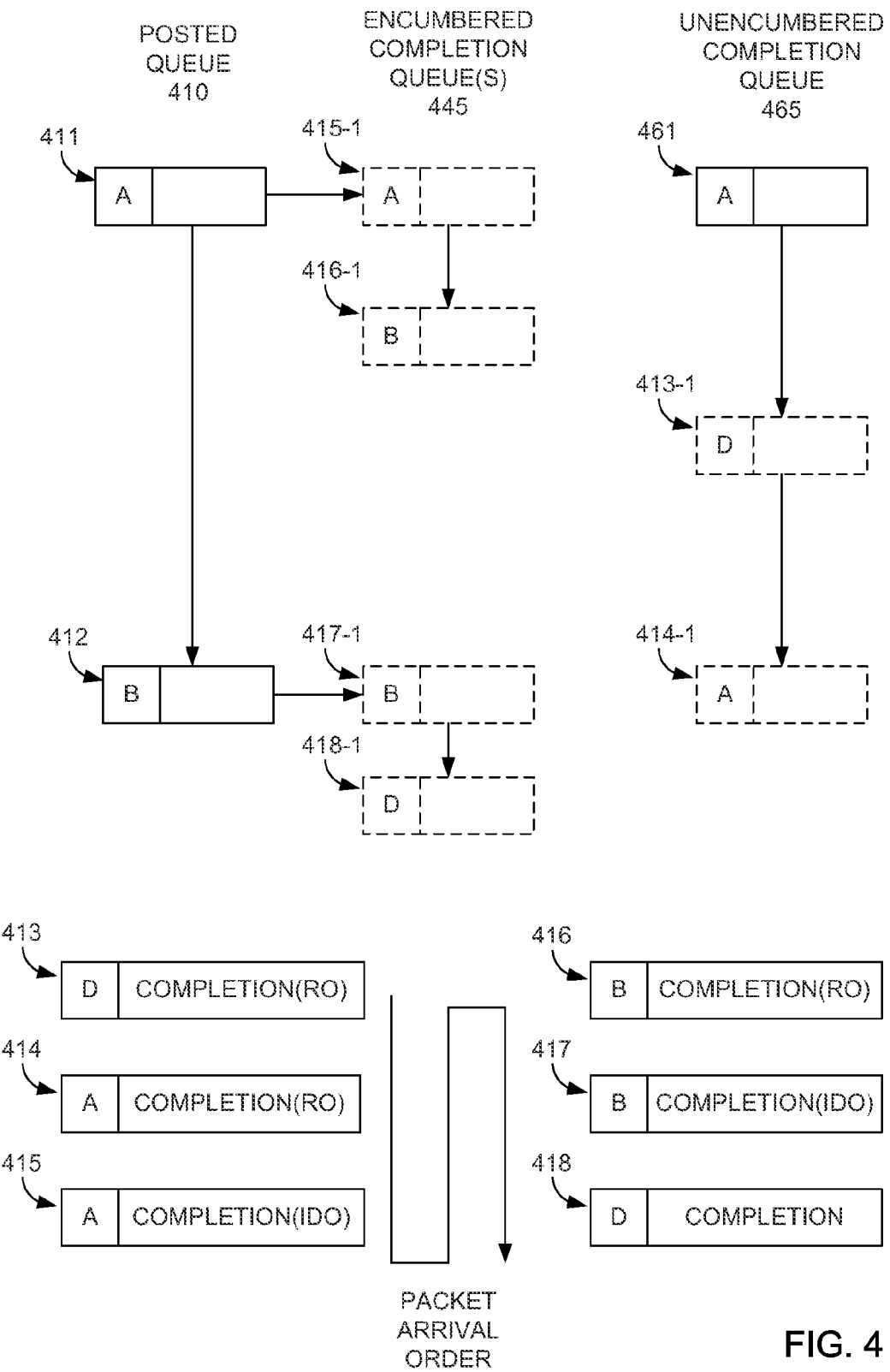
FIG. 4 depicts an example of adding a completion packet to a queue.

FIG. 4 depicts adding a completion packet to a queue. For purposes of the description of FIG. 4, assume that in the beginning, posted queue 410 contains two posted packets 411, 412. These posted packets may have been added to the posted queue according to the process described in FIG. 2. FIG. 4 also includes an unencumbered completion queue 465 containing packet 461. For purposes of this description, assume that at the beginning, packet 461 is already included in the unencumbered completion queue and was received prior to the receipt of packet 411.

At some point in time, packet 413 may be received. As shown, packet 413 is a completion packet from source D, and relaxed ordering (RO) is allowed. As explained above, completion packets with relaxed ordering allowed are allowed to pass any packets, except for other completion packets, regardless of source. The queue determination module may access the posted queue to determine if any completion packets from any source are included in the encumbered completion queues 445 associated with the packets in the posted queue. At this point in time, there are none. Because there are no completion packets in any encumbered completion queue, the packet 413-1 may be added to the unencumbered completion queue 465 by the unencumbered queue module 170. It is thus permissible to de-queue packet 413-1 once it reaches the head of the unencumbered completion queue if sufficient credits are available, because there are no other completion packets that would be impermissibly passed.

At some point in time packet 414 may arrive. As shown, packet 414 is a completion packet from source A and relaxed ordering is allowed. In this case, the queue determination module again determines if any completion packets exist in any of the encumbered completion queues. Just as above, no completion packets exist in any encumbered completion queue so the packet 414-1 may be added to the unencumbered completion queue. It should be noted that due to the FIFO nature of the unencumbered completion queue, it is not possible for packet 414-1 to be de-queued before packet 413-1, thus obeying the rule that completion packets may not pass other completion packets.

At some point in time packet 415 may be received. As shown, packet 415 is a completion packet from source A. However, in this case relaxed ordering is not allowed and only ID based ordering (IDO) is allowed. As described above, an IDO completion packet is allowed to pass all other packets except for other completion packets and posted packets from the same source as the IDO completion packet. Again, the queue determination module examines the encumbered completion queues to determine if any encumbered completion queue contains a completion packet. Finding none, the queue determination module may determine if any posted packet is from the same source as completion packet 415. The process of determining if any posted packet is from the same source may be the same as that described above with respect to non-posted packets by making use of a CAM and priority encoder.

In this case, packet 411 is from the same source as packet 415. As such, it is impermissible for packet 415 to pass packet 411, because relaxed ordering is not in effect. Packet 415-1 is thus placed in the encumbered completion queue associated with packet 411. Just as above with respect to non-posted packets, packets in the encumbered completion queue of a given packet may not be sent upstream until the packet associated with the encumbered completion queue has been sent upstream, At some point in time packet 416 may be received. Packet 416 is a completion packet from source B and relaxed ordering is allowed. Just as above, the queue determination module may determine if any encumbered completion queue contains a completion packet. In one example implementation, the CAM and priority encoder includes a mode that will identify the most recently added posted packet that has a non-empty encumbered completion queue. Here, it is found that the encumbered completion queue associated with packet 411 contains a completion packet 415-1. As such, completion packet 417 may not pass packet 415-1 because to do so would impermissibly result in a completion packet passing another completion packet. As such, the completion packet 416-1 is placed in the encumbered completion queue associated with packet 411. It should be noted that the source of the completion packet is not relevant when determining if a completion packet is to be added to an unencumbered completion queue if RO is in effect. Rather, the presence of any completion packet is all that is needed, because completion packets may not pass each other.

At some point in time, packet 417 may be received. As shown, packet 417 is a completion packet from source B and only IDO ordering is allowed. As mentioned above, IDO completion packets may not pass other completion packets or posted packets from the same source. Again, the queue determination module accesses the posted queue to determine if any encumbered completion queues contain completion packets or if any posted packet contains the same source identifier as the completion packet to be added. In this case, both conditions are true. The encumbered completion queue associated with packet 411 contains completion packets and the posted queue contains packet 412 which is from the same source as packet 417. In this case the queue determination module will determine which posted packet is the most newly added packet that contains an encumbered completion queue including a completion packet or is from the same source as the completion packet.

As shown, packet 412 is the most newly added packet, because it is closer to the tail of the posted queue than packet 411. As such, the queue determination module may add the completion packet 417-1 to the encumbered completion queue associated with packet 412, because that is the most newly added posted packet that either contains a completion packet or has the same source identifier as the completion packet. By including the completion packet 417-1 in the encumbered completion queue associated with packet 412, it can be ensured that packet 417-1 cannot be sent upstream until packet 412 has been sent upstream.

At some point in time, packet 418 may be received. As shown, packet 418 is a completion packet from source D and neither IDO nor RO is allowed. As such, the completion packet may not pass any posted packet. The queue determination module identifies the most newly added posted packet using the mechanisms described above. Packet 418-1 may then be added to the encumbered completion queue associated with the most newly added posted packet, thus ensuring that packet 418-1 will not be de-queued prior to an earlier arriving posted packet. Furthermore, if posted queue 410 were empty at the time of the arrival of packet 418, the packet could immediately be added to the unencumbered completion queue 465. The process of de-queuing packets will be described in greater detail with respect to FIG. 5.

The description of FIGS. 3 and 4 presented above assumed that there was at least one posted packet in the posted queue at the time a new non-posted or completion packet arrived. However, it is possible that the posted queue may be empty upon arrival of a non-posted or completion packet. In such a case, the newly arriving non-posted or completion packet may be added directly to the unencumbered non-posted or completion queue, respectively. As should be clear, if there are no posted packets in the posted queue, it is not possible for an arriving non-posted or completion packet to be encumbered by a non-existent posted packet.

Figure 5:
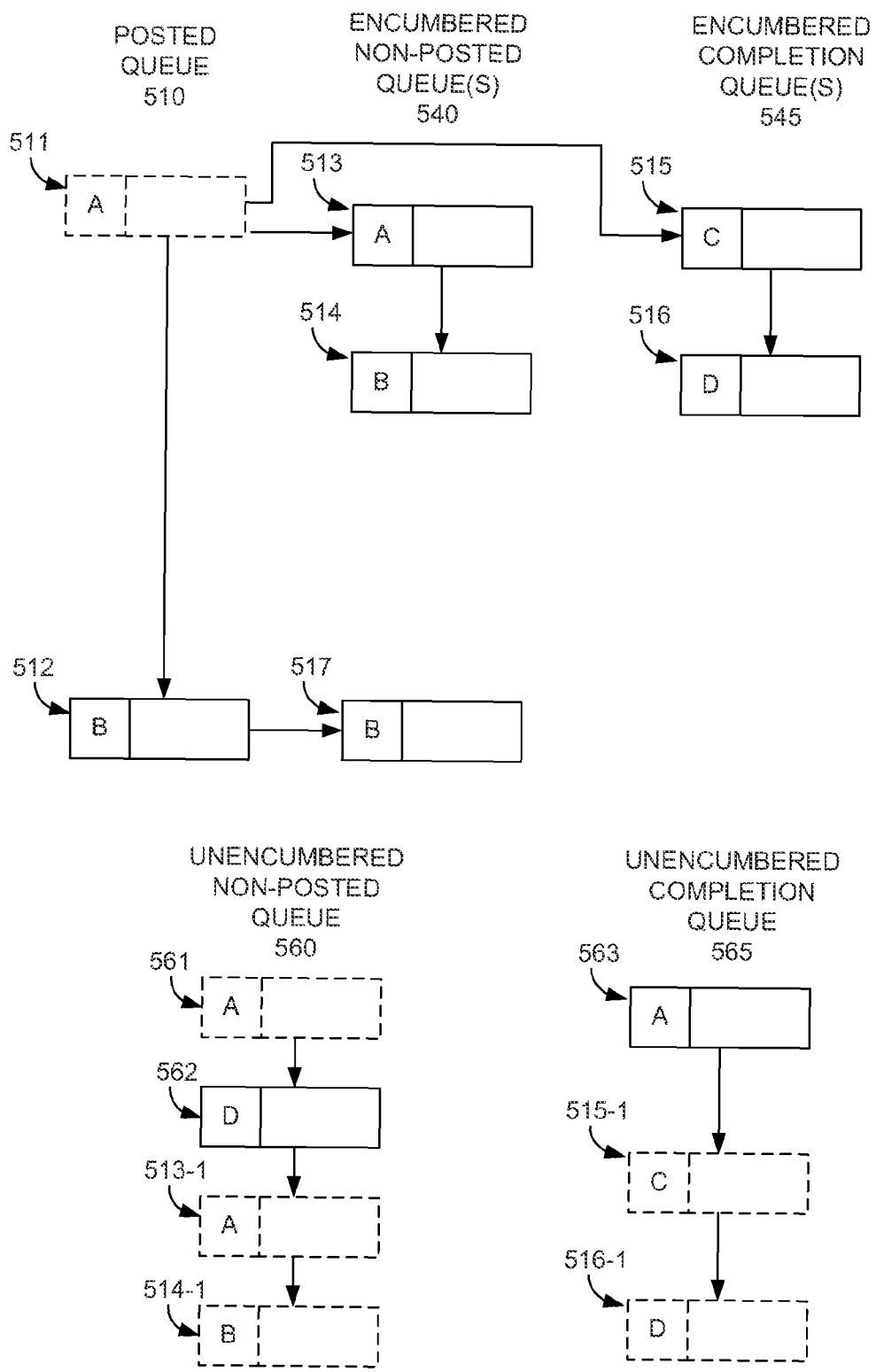
FIG. 5 depicts an example of removing a posted packet from a queue.

FIG. 5 depicts removing a posted packet from a queue. Before describing FIG. 5 in detail, it may be helpful to articulate two general principles with respect to the various queues. The first principle is that whenever sufficient credits are available, it is always permissible to de-queue packets from the head of the posted queue. The reason for this is that the posted queue only contains posted packets and the queue behaves as a FIFO. The nature of a FIFO queue ensures that packets leave the queue in the same order as they entered. As such, it is not possible for a posted packet to pass another posted packet to arrive at the head of the posted queue.

The second principle is that whenever sufficient credits are available, it is always permissible to de-queue packets from the head of the unencumbered non-posted queue or the unencumbered completion queue. The reason for this is that a packet cannot be placed in the unencumbered queues if there is a posted packet that must be sent upstream before the given packet can be sent upstream. In other words, a packet may not be placed in one of the unencumbered queues if that packet cannot be sent upstream independent of the posted queue.

In the case of the unencumbered completion queue, packets are added and de-queued in order, thus ensuring that a completion packet will not pass an earlier arriving completion packet, thus ensuring compliance with the rules for completion packets. For ease of implementation, the same ordering scheme is also used with non-posted packets. However, it should be noted that it is also legal to de-queue any non-posted packet in the unencumbered non-posted queue, as there are no rules that prevent an unencumbered non-posted packet from passing another unencumbered non-posted packet. Other example implementations may de-queue packets from the unencumbered non-posted queue in different orders.

In FIG. 5, assume that in the initial state, the posted queue 510 contains packets 511 and 512. Associated with packet 511 may be an encumbered non-posted queue 540 containing non-posted packets 513 and 514. Also associated with packet 511 may be an encumbered completion queue 545 containing completion packets 515 and 516. Associated with packet 512 may be an encumbered non-posted queue containing packet 517. FIG. 5 also includes an unencumbered non-posted queue 560. For purposes of description, assume that unencumbered completion queue 560 initially contains non-posted packets 561 and 562. Also shown is unencumbered completion queue 565 which initially contains completion packets 563.

As mentioned above, it is always permissible to de-queue a packet at the head of either the posted queue 510 or either of the unencumbered queues 560 and 565 whenever sufficient credits are available. If sufficient credits are available to the unencumbered posted queue, packet 561 may be de-queued and sent upstream as indicated by the dashed lines. No concern for the passing rules is needed because the only way for packet 561 to have reached the head of the unencumbered non-posted queue is by not being dependent on any other packet in any queue. Once packet 561 has been de-queued, packet 562 now becomes the head of the queue and is eligible to be sent upstream. As mentioned above, such ordering is not required for non-posted packets, as it is always legal to de-queue any packet in the unencumbered non-posted queue.

It is also always legal to de-queue a packet at the head of the unencumbered completion queue 565 whenever sufficient credits are available. However, unlike non-posted packets, passing of completion packets by other completion packets is not allowed. By de-queuing packets from the head of the unencumbered completion queue, it can be ensured that a completion packet will not pass another completion packet. This process will be described further below.

A somewhat more interesting case occurs when a packet is de-queued from the posted queue. As shown, packet 511 is at the head of the posted queue, and thus it is permissible to send packet 511 upstream whenever sufficient credits are available. However, packet 511 also is associated with an encumbered non-posted queue containing packets 513, 514 and an encumbered completion queue containing packets 515, 516. Once packet 511 is sent upstream, packets 513, 514 and 515,516 become unencumbered because there is no longer a reason why those packets cannot be sent upstream. In other words, the packet 511 which was preventing packets 513, 514 and 515, 516 from being sent upstream is now gone, so there is no reason why those packets cannot be sent up stream.

The encumbered non-posted queue that was associated with packet 511 may then be moved to the unencumbered non-posted queue. As shown, packets 513-1, 514-1, are added to the unencumbered non-posted queue. Likewise, the encumbered completion queue that was associated with packet 511 may then be moved to the unencumbered completion queue. As shown, packets 515-1, 516-1, are added to the unencumbered non-posted queue. In essence, each encumbered queue associated with packet 511 is added to the end of its respective unencumbered queue. In example implementations using linked lists, this operation may be quite trivial. There may have been a pointer pointing to the head of each of the encumbered queues. The value of that pointer may then simply be transferred to the forward link of the last packet in each of the unencumbered queues respectively. In other words, the forward link of packet 562 may be adjusted to point to the head of the encumbered non-posted queue that was previously associated with packet 511. Likewise, the forward link of packet 563 may be adjusted to point to the head of the encumbered completion queue that was previously associated with packet 511. As such, no physical movement of the packets 513, 514, 515, 516 in memory may be required to add the encumbered queues to the end of their respective unencumbered queues.

By adding the encumbered completion queue to the end of the unencumbered completion queue, proper ordering of completion packets is achieved. As was described above, completion packets are added to encumbered completion queues based on order of arrival. When the rules described with respect to FIG. 4 are followed, no completion packet will be added to an encumbered completion queue ahead of a previously arriving completion packet. It will either be added to the end of the encumbered completion queue containing the previously arriving completion packet or will be added to the encumbered completion queue of a posted packet that arrived after the previously arriving completion packet. In the former case, the completion packets remain in order due to the nature of a FIFO queue. In the latter case, the encumbered completion queue of the later arriving completion packet cannot be added to the unencumbered completion queue prior to its associated posted packet being sent upstream, which in turn prevents it from being added to the unencumbered completion queue until the previously arriving completion packet has already been placed in the unencumbered completion queue. As explained above, the same ordering scheme is used for non-posted packets, however this is for ease of implementation only. There is no requirement with respect to passing of unencumbered posted packets by one another.

Figure 6:
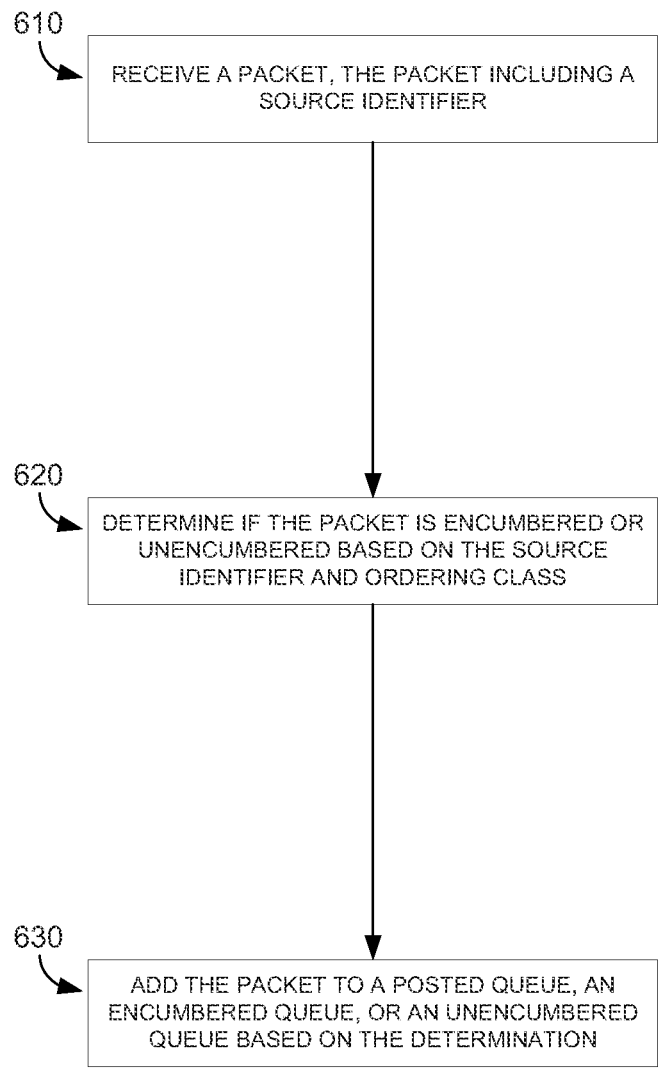
FIG. 6 depicts an example of a flow diagram of adding a packet to a queue.

FIG. 6 depicts a flow diagram of adding a packet to a queue. In block 610 a packet may be received. The packet may include a source identifier. As described above, the source identifier may identify the particular device, or function on a device, that is the source of the packet. In block 620 it may be determined if the packet is encumbered or unencumbered. An encumbered packet may be a packet whose eventual upstream transmission is dependent on another packet. An unencumbered packet may be a packet that may be sent upstream as soon as the packet reaches the head of its queue. The determination may be based on the source identifier included in the packet. The determination may also be based on the ordering class of the packet, such as if the packet is a posted, non-posted, or completion packet.

In block 630 the packet may be added to a posted queue, an encumbered queue, or an unencumbered queue based on the determination in block 620. For example, a posted packet may be added to the posted queue. A non-posted packet may be added to either an encumbered non-posted queue or the unencumbered non-posted queue based on the packets that are already in the various queues, as was described above. A completion packet may be added to any of the completion queues depending on what classes of packet passing have been allowed in the system. Adding packets to a specific queue will be described in further detail with respect to FIG. 7.

Figure 7:
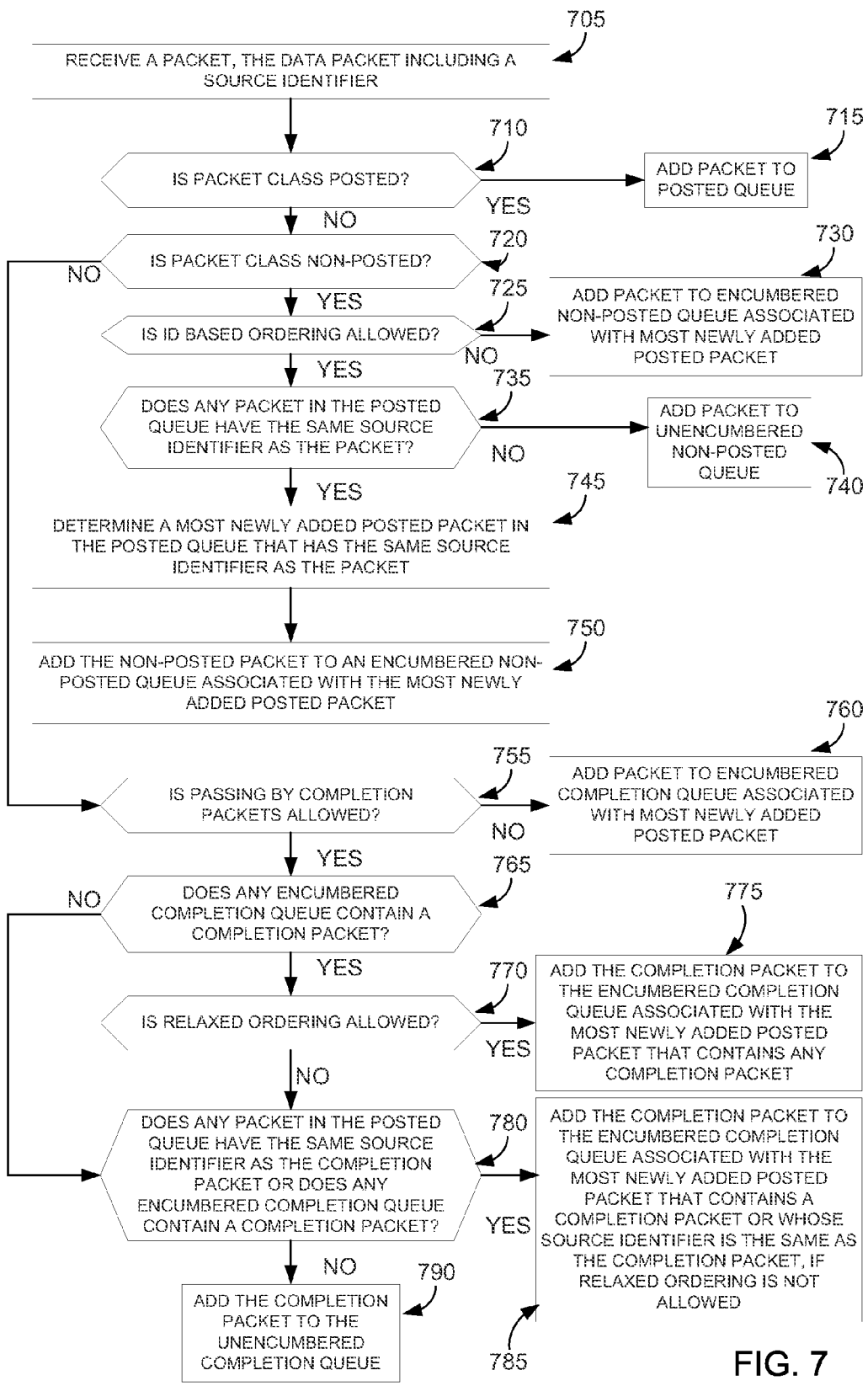
FIG. 7 depicts another example of a flow diagram of adding a packet to a queue.

FIG. 7 depicts another flow diagram of adding a packet to a queue. In block 705 a packet may be received. The packet may include a source identifier. In block 710 the ordering class of the packet may be determined. If the class is posted, the process moves to block 715. In block 715, the packet may be added to the posted queue. As described with respect to FIG. 2, a posted packet is not able to pass any other posted packets As such, a posted packet may always be added to the end of the posted queue.

In block 720 it may be determined if the packet class is non-posted, if the packet class is not non-posted, the process moves to block 755, which is described below. If the packet is a non-posted packet, the process moves to block 725. In block 725 it may be determined if IDO is allowed for the packet. If not, the process moves to block 735, described below. If so, the process moves to block 730. In block 730 the packet may be added to the encumbered non-posted queue that is associated with the most newly added posted packet. In cases where the posted queue is empty, the packet may be added directly to the unencumbered non-posted queue.

In block 735 it may be determined if any packet in the posted queue has the same source identifier as the packet. If not, the process moves to block 740. In block 740, the packet may be added to the unencumbered non-posted queue. As described above, if there are no packets in the posted queue that have the same source identifier as a non-posted packet, then that packet is allowed to pass all other packets and is not encumbered by any other packets. The packet may be added to the unencumbered non-posted queue and once the packet reaches the head of the unencumbered non-posted queue, it is eligible to be sent upstream (credits permitting).

In block 745 the most newly added posted packet in the posted queue that has the same source identifier as the packet may be determined. As explained above, a most newly added packet is a packet that meets the specified criteria that is closest to the end of any given queue. In block 750, the non-posted packet may be added to the encumbered non-posted queue associated with the most newly added packet that was determined in block 745. In other words, the packet is not eligible to be sent upstream until the most newly added packet with the same source identifier is sent upstream. As such, the packet is encumbered by the most newly added packet and is placed in the queue of all non-posted packets encumbered by the most newly added packet.

In block 755 it may be determined if passing by completion packets is allowed. If passing by completion packets is not allowed, the process moves to block 760. In block 760, the packet is added to the encumbered completion queue associated with the most newly added posted packet. In cases where the posted queue is empty, the packet may be added directly to the unencumbered non-posted queue. Because the packet is added to a encumbered completion queue associated with the most newly added posted packet, the completion packet may not be sent upstream until the associated posted packet has been sent upstream. If passing by completion packets is allowed, the process moves to block 765.

In block 765 it may be determined if any encumbered completion queue contains a completion packet. If not, the process moves to block 780, which is described below. If at least one encumbered completion queue contains a completion packet, the process moves to block 770. In block 770 it may be determined if relaxed ordering is allowed. Relaxed ordering, as was described above, means that a completion packet is allowed to pass all other packets, other than completion packets. If relaxed ordering is allowed, the process moves to block 775.

In block 775 the completion packet may be added to the encumbered completion queue that is associated with the most newly added posted packet that contains any completion packet in its associated encumbered completion queue. As such, it is ensured that the completion packet will not pass any other completion packets. If relaxed ordering is not allowed, the process moves to block 780.

In block 780 it may be determined if any packet in the posted queue has the same source identifier as the completion packet or if any encumbered completion queue contains a completion packet. If not, the process moves to block 790. Arriving in block 790 indicates that there are no completion packets in any encumbered completion queues and that there are no posted packets with the same source identifier as the completion packet. As such, the completion packet is not encumbered by any other packets. In block 790 the completion packet may be added to the unencumbered completion queue.

Figure 8:
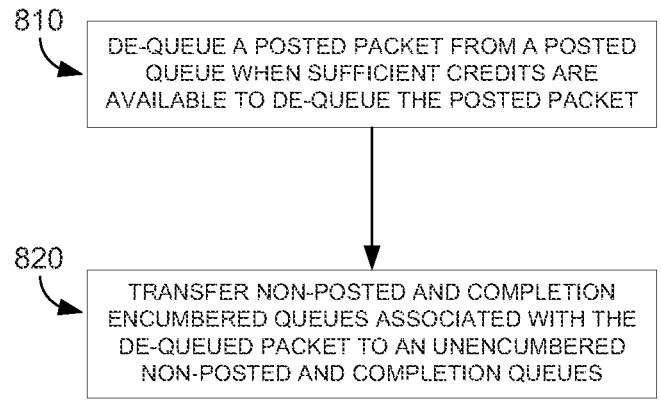
FIG. 8 depicts an example of a flow diagram of removing a packet from a queue.

If any packet in the posted queue has the same source identifier as the completion packet or if any encumbered completion queue contains a completion packet, the process moves to block 785. Arrival in block 785 indicates that there are either completion packets in at least one encumbered completion queue or that there is at least one posted packet in the posted queue that has the same source identifier as the completion packet. Given the completion packet passing rules described above, this means that the completion packet is not allowed to pass. In block 785 the completion packet may be added to the encumbered completion queue associated with the most newly added posted packet that contains a completion packet or whose source identifier is the same as the completion packet, if relaxed ordering is not allowed. As such, it can be ensured that the completion packet may not pass any other completion packets nor any posted packet from the same source, FIG. 8 depicts a flow diagram of removing a packet from a queue. As was described above, when using credit based flow control, packets may be removed from a queue so long as sufficient credits are available. In block 810 a posted packet may be de-queued from a posted queue when sufficient credits are available to de-queue the posted packet. As was described above, a packet may be de-queued from the head of the posted queue whenever sufficient credits are available without any additional verification of compliance with packet passing rules.

In block 820 encumbered non-posted and completion queues that are associated with the packet de-queued in block 810 may be transferred to the unencumbered non-posted and completion queues, respectively. As described above, every posted packet in the posted queue may be associated with an encumbered non-posted queue and an encumbered completion queue. The encumbered queues may contain zero or more packets. The packets, if any, in the encumbered queues associated with the de-queued posted packet may be placed in the respective unencumbered queues in the same order as they existed in the encumbered queues. As described above, the packets may be added to the end of the unencumbered queues.

Figure 9:
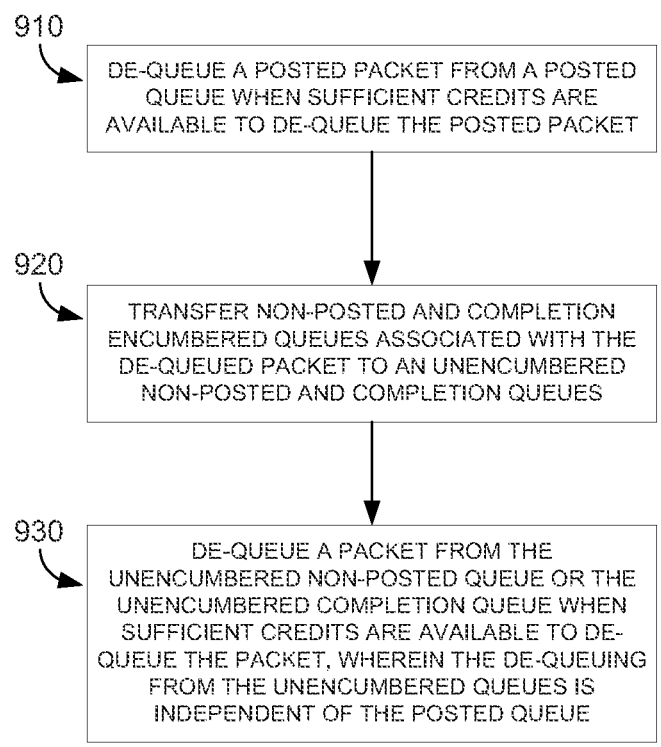
FIG. 9 depicts another example of a flow diagram of removing a packet from a queue.

FIG. 9 depicts another flow diagram of removing a packet from a queue. As was described above with respect to FIG. 8, in block 910 a posted packet may be de-queued from a posted queue when sufficient credits are available to de-queue the posted packet. In block 920, just as in block 820, encumbered non-posted and completion queues that are associated with the packet de-queued in block 910 may be transferred to the unencumbered non-posted and completion queues, respectively.

In block 930 a packet from the unencumbered non-posted queue or the unencumbered completion queue may be de-queued when sufficient credits are available. As described above, packets may be de-queued from the head of the unencumbered queues whenever sufficient credits are available without any additional verification of compliance with packet passing rules. Furthermore, de-queuing packets from the unencumbered queues is independent of the posted queue, or each other, as packets in the unencumbered queues are not encumbered by any packets in the posted queue or the corresponding unencumbered queue.

I claim:

1. A method comprising:
receiving a packet including a source identifier;
determining whether a class of the packer is posted;
determining whether the packet is encumbered based on the source identifier and a class of the packet; and
based on a determination of whether the class of the packet is posted and a determination of whether the packet is encumbered, adding the packet to one of a plurality of queues, the plurality of queues comprising a posted queue, an encumbered non-posted queue, and an unencumbered non-posted queue.

2. The method of claim 1 further comprising:
determining that the class of the packet is posted; and
in response to determining that the class of the packet is posted, adding the packet to the posted queue.

3. The method of claim 2 further comprising:
determining that the class of the packet is non-posted;
determining if any packet in the posted queue has the same source identifier as the packet; and
adding the packet to the unencumbered non-posted queue in response to determining that the class of the packet is non-posted and there are no packets with the same source identifier in the posted queue.

4. The method of claim 3 further comprising:
determining a most newly added posted packet in the posted queue that has the same source identifier as the packet; and
adding the packet to the encumbered non-posted queue associated with the most newly added posted packet if the packet has not been added to the unencumbered non-posted queue.

5. The method of claim 4 further comprising:
determining if the class of the packet is completion;
determining if passing by completion packets is allowed; and
adding the packet to an encumbered completion queue associated with the most newly added posted packet in the posted queue in response to determining that passing by completion packets is not allowed, wherein the plurality of queues further comprises the encumbered completion queue.

6. The method of claim 5 further comprising:
determining if any encumbered completion queue associated with any packet in the posted queue contains a completion packet;
determining if relaxed ordering is allowed; and
adding the completion packet to the encumbered completion queue associated with the most newly added posted packet that contains any completion packet in response to determining that the relaxed ordering is allowed.

7. The method of claim 6 further comprising:
determining if any packet in the posted queue has the same source identifier as the completion packet;
adding the completion packet to the encumbered completion queue associated with the most newly added posted packet that contains a completion packet or whose source identifier is the same as the completion packet, in response to determining that the relaxed ordering is not allowed.

8. The method of claim 7 further comprising:
adding the completion packet to an unencumbered completion queue in response to determining the completion packet has not been added to any encumbered completion queue, wherein the plurality of queues further comprises the unencumbered completion queue.

9. The method of claim 1 wherein the packet is determined to be encumbered if the upstream transmission of the packet is dependent on another packet.

10. The method of claim 1 wherein the packet is determined to be unencumbered if the packet could be sent upstream as soon as the packet reached a head of a queue.

11. The method of claim 1 wherein the plurality of queues further comprises an encumbered completion queue and an unencumbered completion queue.

12. A device comprising:
a memory to include a plurality of queues for received packets; and
a queue determination module to determine in which queue of the plurality of queues an arriving packet will be placed, wherein the plurality of queues comprises a posted queue, an encumbered non-posted queue, and an unencumbered non-posted queue.

13. The device of claim 12 further comprising a posted queue module to:
maintain an encumbered non-posted queue and a completion queue associated with each packet in the posted queue, wherein if the arriving packet is encumbered by any packet in the posted queue, the arriving packet is added to the encumbered non-posted queue or the completion queue associated with the most newly added encumbering packet.

14. The device of claim 13 wherein the posted queue module is a module to:
send an oldest packet from the posted queue upstream when sufficient credits are available; and
transfer the encumbered non-posted and completion queues associated with the sent packet to the unencumbered non-posted and completion queues.

15. The device of claim 14 wherein the posted queue module is a module to:
store source identifiers of each packet in the posted queue in a content addressable memory;
compare the source identifier of the arriving packet to the content addressable memory to determine if the arriving packet is encumbered; and
provide an indication if the source identifier of the arriving packet matches the source identifier of any packet in the posted queue, wherein the queue determination module places the packet in the encumbered non-posted or completion queues associated with the most newly added packet in the posted queue.

16. The device of claim 14 further comprising a encumbered queue module to:
provide an indication if any encumbered completion queue associated with any packet in the posted queue contains a completion packet, wherein if the arriving packet is a completion packet, the queue determination module places the arriving packet in the encumbered completion queue associated with the most newly received packet in the posted queue that contains the completion packet.

17. The device of claim 12 wherein the queue determination module is further to determine whether the arriving packet is encumbered based on whether the upstream transmission of the arriving packet is dependent on another packet.

18. The device of claim 12 wherein the plurality of queues further comprises an encumbered completion queue and an unencumbered completion queue.

* * * * *